United States Patent
Ishikura et al.

(10) Patent No.: US 11,493,086 B2
(45) Date of Patent: Nov. 8, 2022

(54) AL-BASED BEARING ALLOY AND SLIDE BEARING USING SAME

(71) Applicant: DAIDO METAL COMPANY LTD., Nagoya (JP)

(72) Inventors: Kei Ishikura, Nagoya (JP); Akihiro Kose, Nagoya (JP); Kazuaki Toda, Nagoya (JP); Eisaku Inoue, Nagoya (JP)

(73) Assignee: DAIDO METAL COMPANY LTD, Nagoya (JP)

( * ) Notice: Subject to any disclaimer, the term of this patent is extended or adjusted under 35 U.S.C. 154(b) by 725 days.

(21) Appl. No.: 16/088,369

(22) PCT Filed: Mar. 28, 2017

(86) PCT No.: PCT/JP2017/012630
§ 371 (c)(1),
(2) Date: Sep. 25, 2018

(87) PCT Pub. No.: WO2017/170545
PCT Pub. Date: Oct. 5, 2017

(65) Prior Publication Data
US 2020/0300297 A1 Sep. 24, 2020

(30) Foreign Application Priority Data

Mar. 30, 2016 (JP) .................................. 2016-068110
Mar. 30, 2016 (JP) ............................. JP2016-068111

(51) Int. Cl.
*F16C 33/12* (2006.01)
*C22C 21/02* (2006.01)
(Continued)

(52) U.S. Cl.
CPC ............ *F16C 33/121* (2013.01); *C22C 21/00* (2013.01); *C22C 21/02* (2013.01); *C22C 21/12* (2013.01);
(Continued)

(58) Field of Classification Search
CPC ......... C22C 21/00; C22C 21/02; C22C 21/12; C22C 21/14; C22C 21/18; C22F 1/04;
(Continued)

(56) References Cited

U.S. PATENT DOCUMENTS

2017/0167001 A1\* 6/2017 Hori ........................... B21J 5/02

FOREIGN PATENT DOCUMENTS

| CN | 101805844 A | 8/2010 |
| CN | 102021448 A | 4/2011 |

(Continued)

OTHER PUBLICATIONS

JP-2001140890-A English (Year: 2021).\*
(Continued)

*Primary Examiner* — Robert S Jones, Jr.
*Assistant Examiner* — Jiangtian Xu
(74) *Attorney, Agent, or Firm* — Karceski IP Law, PLLC

(57) ABSTRACT

An Al-based bearing alloy and a slide bearing incorporating the alloy exhibit high corrosion resistance and maintain high strength for a long period of time even in a high temperature environment. The Al-based bearing alloy and slide bearing includes an Al matrix, and acicular compounds which are needle-shaped that precipitate at a plurality of sites in a structure of the Al matrix, and that have a minor diameter and a major diameter.

3 Claims, 7 Drawing Sheets

(51) Int. Cl.

| | | |
|---|---|---|
| *C22C 21/12* | (2006.01) | |
| *C22C 21/14* | (2006.01) | |
| *C22C 21/18* | (2006.01) | |
| *C22F 1/043* | (2006.01) | |
| *C22F 1/053* | (2006.01) | |
| *C22F 1/057* | (2006.01) | |
| *C22C 21/00* | (2006.01) | |
| *C22F 1/04* | (2006.01) | |

(52) U.S. Cl.
CPC .............. *C22C 21/14* (2013.01); *C22C 21/18* (2013.01); *C22F 1/04* (2013.01); *C22F 1/043* (2013.01); *C22F 1/053* (2013.01); *C22F 1/057* (2013.01); *F16C 2204/20* (2013.01)

(58) Field of Classification Search
CPC .......... C22F 1/043; C22F 1/053; C22F 1/057; F16C 33/121; F16C 2204/20
See application file for complete search history.

(56) References Cited

FOREIGN PATENT DOCUMENTS

| CN | 102301020 A | 12/2011 | | |
|---|---|---|---|---|
| DE | 10135895 A1 | 4/2002 | | |
| EP | 2634276 A1 | 9/2013 | | |
| EP | 3130684 A1 | 2/2017 | | |
| EP | 3187604 A1 | 7/2017 | | |
| GB | 2367070 A | 3/2002 | | |
| JP | 2001140890 A | 5/2001 | | |
| JP | 2001140890 A | * | 5/2001 | |
| JP | 2002038230 A | 2/2002 | | |
| JP | 2002224852 A | 8/2002 | | |
| JP | 2002224852 A | * | 8/2002 | ........... B32B 15/016 |
| JP | 2005179707 A | 7/2005 | | |
| JP | 2007016275 A | 1/2007 | | |
| JP | 2013181621 A | 9/2013 | | |
| JP | 2015172215 A | 10/2015 | | |

OTHER PUBLICATIONS

JP-2002224852-A English (Year: 2021).*
Japanese Office Action dated Apr. 23, 2019, for Japanese Patent Application No. 2018-508071.
Chinese Office Action dated Jul. 1, 2019, for Chinese Patent Application No. 201780020966.3.
Extended European Search Report dated Jul. 29, 2019, for European Patent Application No. 17775082.5.
European Office Action dated Mar. 25, 2020, for European Patent Application No. 17775082.5.
Korean Office Action dated Jun. 10, 2020, for Korean Patent Application No. 10-2018-7028296.
International Search Report dated Jun. 13, 2017, for International Patent Application No. PCT/JP2017/012630.

* cited by examiner

| | Test Number | Constituent Elements | | | | | | | | Acicular Compound | | Angular Difference | | | Test Results | | Production Method |
|---|---|---|---|---|---|---|---|---|---|---|---|---|---|---|---|---|---|
| | | Al | Zn | Cu | Si | Mg | Mn | Ti | V | Number (Pieces) | Largest Minor Diameter (nm) | 35°~55° % | 80°~90° % | 0°~10° % | First Test | Second Test | |
| Examples | 1 | rem. | 0.5 | 4.0 | 0.0 | 0.1 | — | — | — | 215 | 2 | 65 | 18 | 0 | A | A | 1 |
| | 2 | rem. | 5.0 | 0.0 | 4.5 | — | 0.1 | — | — | 45 | 50 | 31 | 10 | 8 | A | A | 1 |
| | 3 | rem. | 1.5 | 1.8 | 1.0 | — | — | — | — | 202 | 1 | 33 | 12 | 8 | B | B | 1 |
| | 4 | rem. | 3.0 | 1.8 | 3.5 | — | — | 0.1 | 0.1 | 50 | 115 | 32 | 15 | 6 | B | B | 1 |
| | 5 | rem. | 4.0 | 1.5 | 7.0 | 0.5 | — | — | — | 168 | 10 | 32 | 13 | 12 | C | B | 1 |
| | 6 | rem. | 4.5 | 1.0 | 9.0 | — | 0.5 | — | — | 120 | 18 | 32 | 4 | 8 | C | B | 1 |
| | 7 | rem. | 6.0 | 0.9 | 2.5 | — | — | 0.5 | — | 30 | 50 | 31 | 4 | 15 | C | B | 1 |
| | 8 | rem. | 7.0 | 0.8 | 10.0 | — | — | — | 0.5 | 20 | 52 | 30 | 9 | 15 | C | B | 1 |
| | 9 | rem. | 8.0 | 0.5 | 4.0 | 0.2 | — | — | 0.2 | 220 | 1 | 33 | 8 | 12 | C | B | 1 |
| | 10 | rem. | 0.0 | 3.0 | 2.0 | — | — | — | — | 195 | 5 | 42 | 15 | 5 | A | A | 2 |
| | 11 | rem. | 0.0 | 2.5 | 4.0 | 0.5 | — | — | — | 172 | 12 | 32 | 11 | 8 | A | A | 2 |
| | 12 | rem. | 0.0 | 2.0 | 3.0 | — | 0.5 | — | 0.1 | 87 | 20 | 35 | 11 | 14 | C | B | 2 |
| | 13 | rem. | 0.0 | 3.0 | 2.5 | — | — | 0.1 | 0.2 | 112 | 18 | 48 | 8 | 13 | C | B | 2 |
| | 14 | rem. | 0.0 | 0.8 | 6.0 | — | 0.2 | — | — | 35 | 42 | 23 | 8 | 8 | D | C | 2 |
| | 15 | rem. | 0.5 | 3.0 | 4.0 | 0.1 | — | — | 0.1 | 256 | 1 | 26 | 15 | 4 | D | C | 1 |
| | 16 | rem. | 3.0 | 1.8 | 3.5 | — | — | — | — | 220 | 5 | 24 | 8 | 13 | D | C | 1 |
| | 17 | rem. | 4.5 | 1.0 | 9.0 | — | 0.5 | — | — | 105 | 30 | 21 | 20 | 0 | D | C | 1 |
| | 18 | rem. | 5.0 | 1.6 | 3.0 | — | — | 0.5 | — | 12 | 48 | 23 | 8 | 4 | D | C | 1 |
| Comparative Examples | 1 | rem. | 6.0 | 0.9 | 2.5 | — | — | — | 0.5 | 0 | — | — | — | — | × | × | — |
| | 2 | rem. | 0.0 | 0.8 | 6.0 | — | 0.2 | — | 0.2 | 0 | — | — | — | — | × | × | — |

FIG. 6

| TEST CONDITIONS ||
|---|---|
| ROTATIONAL SPEED | 6500rpm |
| INTERFACIAL PRESSURE | 75MPa、80MPa、85MPa、90MPa |
| TEMPERATURE | 170°C±2°C |
| TURNOVER NUMBER | $10^7$ TIMES |
| LUBRICATING OIL | VG68 |

FIG.7

AL-BASED BEARING ALLOY AND SLIDE BEARING USING SAME

CROSS-REFERENCE TO RELATED APPLICATIONS

This is a National Stage Entry into the United States Patent and Trademark Office from International PCT Patent Application No. PCT/JP2017/012630, having an international filing date of Mar. 28, 2017, which is based on and claims priority to Japanese Patent Application No. 2016-068110, filed on Mar. 30, 2016, and to Japanese Patent Application No. 2016-068111, filed on Mar. 30, 2016, the entire contents of all of which are incorporated herein by reference.

FIELD OF THE INVENTION

The present invention relates to an Al-based bearing alloy and a slide bearing that uses the Al-based bearing alloy.

BACKGROUND OF THE INVENTION

A slide bearing that is to be used in an engine of a vehicle or the like is required to maintain high strength under a high temperature, even when repeated changes in the temperature occur. To meet this requirement, an Al-based bearing alloy has already been proposed in which fatigue strength at high temperature is enhanced by forming additive elements into a solid solution (see Japanese Patent Laid-Open No. 2015-172215). Further, an Al-based bearing alloy has been proposed in which fatigue strength at high temperature is enhanced by adding hard particles for which the stability of the physical properties at high temperature is high (see Japanese Patent Laid-Open No. 2007-016275).

However, in the case of Japanese Patent Laid-Open No. 2015-172215, Ag is used as an additive element. Therefore there is the problem that the Al-based bearing alloy is expensive. Further, even when hard particles are added as in Japanese Patent Laid-Open No. 2007-016275, there is the problem that when using an Al-based bearing alloy that has Al as a main component, sufficient strength cannot be secured in diesel engines of recent years which are exposed to increasingly higher temperatures. Therefore, conventionally a Cu-based bearing alloy that adopts Cu as a main component is used in diesel engines in which the temperature environment is severe. However, a Cu-based bearing alloy is expensive and there is also the problem that the corrosion resistance of a Cu-based bearing alloy with respect to the sulfur content contained in fuel is poor.

SUMMARY OF THE INVENTION

Therefore, an object of the present invention is to provide an Al-based bearing alloy which exhibits high corrosion resistance and in which high strength is maintained for a long period of time even in a high temperature environment, and to also provide a slide bearing that uses the Al-based bearing alloy.

To solve the above described problems, an Al-based bearing alloy of the present embodiment includes an Al matrix, and a plurality of needle-shaped acicular compounds that precipitate in a structure of the Al matrix, the acicular compounds each having a minor diameter and a major diameter.

Thus, the present embodiment is an Al-based bearing alloy that contains Al as the main component. The Al-based bearing alloy of the present embodiment is not only inexpensive compared to the conventional Cu-based bearing alloys, but also exhibits improved corrosion resistance with respect to sulfides originating from fuel. Further, in the case of the present embodiment, acicular compounds precipitate in the structure of the Al matrix in the Al-based bearing alloy. The acicular compounds that precipitate in the Al matrix suppress the occurrence of sliding within grains in the Al matrix. As a result, the strength is not liable to decrease even in a high temperature environment. Accordingly, not only can corrosion resistance be enhanced, but high strength in a high temperature environment can be maintained for a long period of time even though the bearing alloy is Al-based.

Further, in the Al-based bearing alloy of the present embodiment, the acicular compounds include a selected acicular compound that is arbitrarily selected, and neighboring acicular compounds located on an imaginary straight line extended from the major diameter of the selected acicular compound. The neighboring acicular compounds include compounds for which an angular difference is in a range of 35° to 55°, the angular difference being a difference of an angle between the imaginary straight line and the major diameter of the neighboring acicular compound.

Thus, in the Al-based bearing alloy of the present embodiment, an angular difference between an imaginary straight line matching an extended line of the major diameter of a selected acicular compound and a major diameter of a neighboring acicular compounds is set. By this means, even if a minute crack arises, the direction of the expanded minute crack is changed by an acicular compound. As a result, the occurrence of a situation in which the minute crack expands and develops in that manner into a large crack that penetrates the Al-based bearing alloy is inhibited. Accordingly, high strength can be maintained for a long period of time even in a high temperature environment.

In addition, according to the Al-based bearing alloy of the present embodiment, it is preferable that the acicular compounds include, in a setting region that is set in advance, 30% or more of acicular compounds for which the angular difference is in a range of 35° to 55°, that is, as neighboring acicular compounds, 30% or more of neighboring acicular compounds for which an angular difference with respect to a selected acicular compound is in a range of 35° to 55°.

Further, according to the Al-based bearing alloy of the present embodiment, it is preferable that the acicular compounds include, in a setting region that is set in advance, 30% to 70% of acicular compounds for which the angular difference is in a range of 35° to 55°, 10% or less of acicular compounds for which the angular difference is in a range of 0° to 10°, and 10% or more of acicular compounds for which the angular difference is in a range of 80° to 90°.

Thus, according to the Al-based bearing alloy of the present embodiment, by including a large amount of acicular compounds for which the angular difference is in a range of 35° to 55°, a change in the direction of an expanded minute crack is promoted, thereby hindering the development of the minute crack into a large crack. Therefore, high strength can be maintained for a long period of time even in a high temperature environment. A form that mostly contains neighboring acicular compounds for which an angular difference with respect to a selected acicular compound is in a range of 35° to 55° is preferable. Further, a form in which neighboring acicular compounds for which the angular difference is greater than 10° and less than 35° and neighboring acicular compounds for which the angular difference is greater than 55° and less than 80° are included to the same extent is preferable. By this means, suppression of the development of minute cracks into large cracks can be efficiently performed.

In the Al-based bearing alloy of the present embodiment, a minor diameter of the acicular compounds is 50 nm or less.

The finer that the acicular compounds which precipitate in the Al-based bearing alloy are, the lower the risk is of the acicular compounds serving as starting points for cracks. Therefore, it is preferable that the acicular compounds have a minor diameter of 50 nm or less, which is sufficiently fine. As a result, the acicular compounds do not become starting points for cracks. Therefore, high strength can be maintained for a long period of time.

The Al-based bearing alloy of the present embodiment contains Al as a main component, and contains two or more types of element selected from a group consisting of Zn, Cu and Si.

Thus, the Al-based bearing alloy of the present embodiment contains Al as a main component, and need not contain expensive Ag or the like.

Therefore, high strength can be maintained for a long period of time using inexpensive additive elements.

Further, according to another aspect of the present invention, it suffices that the Al-based bearing alloy contains Al as a main component and is an Al-based bearing alloy to be used for a slide bearing, and in which fatigue breakdown does not occur after a test that satisfies all of test conditions (1) to (3) hereunder:

(1) A contact interfacial pressure during sliding with respect to a counterpart member is 75 MPa;

(2) A temperature during sliding with respect to the counterpart member is 170° C.; and (3) A turnover number during sliding with respect to the counterpart member is $10^7$ times at 6,500 rpm.

A slide bearing of the present embodiment includes a bearing alloy layer that is formed using the aforementioned Al-based bearing alloy, and a base material provided in a superimposed manner on the bearing alloy layer.

Accordingly, not only can corrosion resistance be enhanced, but high strength can be maintained for a long period of time in a high temperature environment even though the bearing alloy is Al-based.

The slide bearing of the present embodiment can be, for example, a slide bearing such as a half-bearing, and may also be another kind of slide bearing such as a bushing or a thrust washer.

According to a further aspect of the present invention, a bearing apparatus having the slide bearing and a shaft is provided.

It suffices that the bearing apparatus constitutes a unit with a shaft and a bearing, and more specifically, is suitable for application as an engine of various kinds.

BRIEF DESCRIPTION OF THE DRAWINGS

FIG. 6 is a schematic chart showing examples of the Al-based bearing alloy according to one embodiment and comparative examples.

FIG. 7 is a schematic chart showing test conditions for the Al-based bearing alloy according to one embodiment.

DESCRIPTION OF EMBODIMENT(S) OF THE INVENTION

Hereunder, one embodiment of Al-based bearing alloy is described based on the accompanying drawings.

Figure 1:
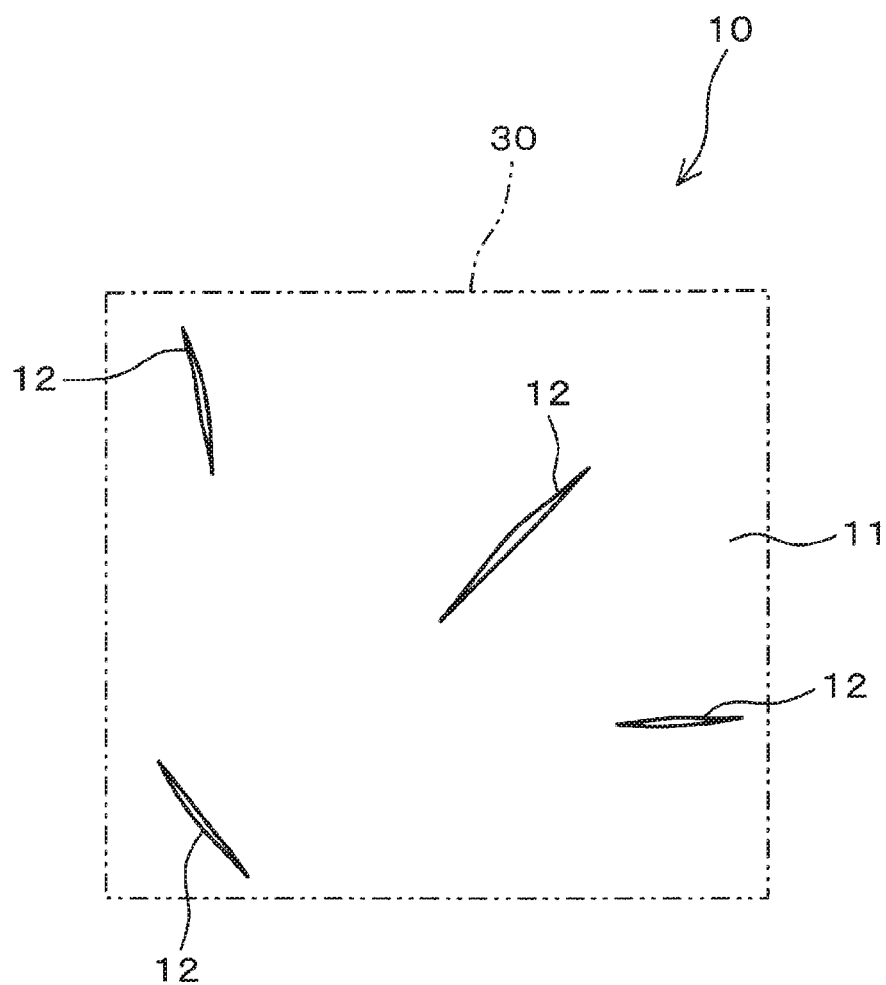
FIG. 1 is a schematic diagram illustrating the structure of an Al-based bearing alloy according to one embodiment.

As illustrated in FIG. 1, an Al-based bearing alloy (hereinafter, abbreviated to "bearing alloy") 10 of one embodiment is an Al-based alloy that contains Al as a main component. The bearing alloy 10 contains two or more types of element selected from the group consisting of Zn, Cu and Si as additives, and also contains unavoidable impurities. The bearing alloy 10 also contains acicular compounds 12 in an Al matrix 11 constituting the structure thereof. The acicular compounds 12 adopt as constituent elements any two or more types of element among Al, Zn, Cu and Si that constitute the bearing alloy. As indicated by its name, the acicular compound 12 assumes an acicular shape in which the major diameter is large compared to the minor diameter. In the case of the present embodiment, preferably the minor diameter of the acicular compound 12 is set to 50 nm or less. Further, although depending on the ratio with respect to the minor diameter, preferably the major diameter of the acicular compound 12 is set to 100 nm or more.

Thus, in the bearing alloy 10 of the present embodiment, the acicular compounds 12 precipitate in the Al matrix 11. The acicular compounds 12 that precipitate in the Al matrix 11 of the bearing alloy 10 disperse in the Al matrix 11. Therefore, when a minute crack arises in the Al matrix 11 due to fatigue of the bearing alloy 10, the minute crack collides with the acicular compounds 12 that are dispersed in the Al matrix 11. When a minute crack collides with the acicular compounds 12 in this manner, the direction of the minute crack is changed by the acicular compounds 12, thereby hindering development of the minute crack into a large crack. In this way the acicular compounds 12 hinder the development into large cracks of minute cracks that arise in the Al matrix 11 due to fatigue of the bearing alloy 10. As a result, even though the bearing alloy 10 is aluminum-based, the bearing alloy 10 can maintain high fatigue strength for a long time period in a high temperature environment without a large crack that affects the strength thereof arising.

Further, in the bearing alloy 10 of the present embodiment, fine acicular compounds 12 precipitate in the Al matrix 11. The acicular compounds 12 that precipitate in the Al matrix 11 of the bearing alloy 10 suppress so-called "intragranular sliding" that is sliding within grains in the Al matrix 11. As a result, even though the bearing alloy 10 is aluminum-based, the bearing alloy 10 can maintain high strength for a long period of time in a high temperature environment.

Figure 2:
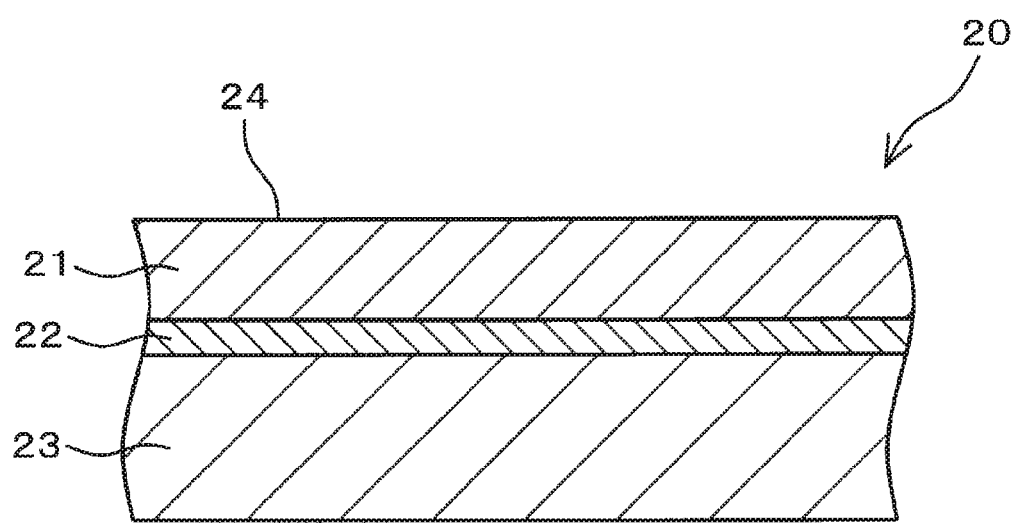
FIG. 2 is a schematic cross-sectional view illustrating a slide bearing to which the Al-based bearing alloy according to one embodiment is applied.

In addition, the bearing alloy 10 can be applied to a slide bearing 20 as illustrated in FIG. 2. In addition to a bearing alloy layer 21 composed of the above-described bearing alloy 10, the slide bearing 20 includes an intermediate layer 22 and a base material layer 23. The bearing alloy layer 21 is provided on a sliding surface 24 side, that is, on a sliding counterpart member side, of the base material layer 23. The slide bearing 20 may include the intermediate layer 22 between the base material layer 23 and the bearing alloy layer 21 as in the present embodiment. The intermediate layer 22 increases the adhesion between the bearing alloy layer 21 and the base material layer 23. The base material layer 23 is formed, for example, of Fe or an alloy that contains Fe as a main component. The intermediate layer 22 is formed of Al or an alloy that contains Al as a main component.

Next, a plurality of embodiments of a method for producing the bearing alloy 10 according to the above described configuration will be described.

First Embodiment of Production Method

In the bearing alloy 10, the acicular compounds 12 precipitate in the Al matrix 11 by means of a heat treatment. The precursor of the bearing alloy 10 is heated to a preset treatment temperature, and thereafter is held for a predetermined time period at the treatment temperature. Thereafter, by controlling the treatment temperature and the treatment time period during the heat treatment, a state in which the acicular compounds 12 are precipitated in the Al matrix 11 of the bearing alloy 10 is entered. Thus, by controlling the treatment temperature and treatment time period at which overaging occurs during the heat treatment, the bearing alloy 10 of this embodiment has a structure in which minute acicular compounds 12 as described above are precipitated. As the treatment temperature is increased or as the treatment time period is lengthened, the greater the extent to which the size of the acicular compounds 12 tends to increase, and the greater the degree to which acicular compounds 12 for which an angular difference in a range of 35° to 55° tend to increase.

Second Embodiment of Production Method

The second embodiment of the production method can be used in the case of joining the bearing alloy layer 21 and the base material layer 23 as illustrated in FIG. 2.

Figure 3:
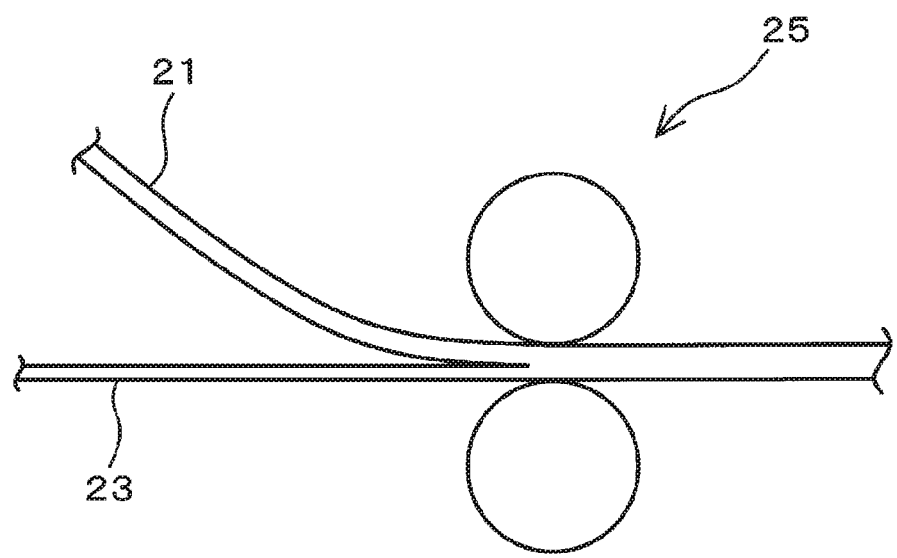
FIG. 3 is a schematic diagram illustrating a method for producing a slide bearing according to one embodiment.

According to the second embodiment of the production method, the bearing alloy layer 21 and the base material layer 23 are joined by rolling as illustrated in FIG. 3. In this case, the intermediate layer 22 may be provided between the base material layer 23 and the bearing alloy layer 21 to increase the adhesion therebetween. Here, a difference is set between the respective feeding rates of the bearing alloy layer 21 and the base material layer 23 that are fed to the rolling machine 25. That is, the bearing alloy layer 21 and the base material layer 23 of this embodiment are fed to a rolling machine 25 so that the feeding rate difference therebetween is a large difference in the range of 14 to 32%. Rolling of the bearing alloy layer 21 and the base material layer 23 is performed once or a plurality of times. Note that, FIG. 3 illustrates one example of the rolling method, and the vertical relationship between the bearing alloy layer 21 and the base material layer 23 and the like shown in FIG. 3 can be arbitrarily changed. The larger that the feeding rate difference is made, or the greater that the number of rolling passes is, the smaller that the size of the acicular compounds 12 tends to be, and the greater the tendency is for the acicular compounds 12 for which an angular difference is in a range of 35° to 55° to increase.

The bearing alloy layer 21 contains compounds having Al, Zn, Cu and Si as constituent elements at a stage prior to rolling. At this time, the shape of the compounds contained in the bearing alloy layer 21 prior to rolling is not necessarily acicular, and the compounds are in a granular form and dispersed in the Al matrix 11. By rolling the bearing alloy layer 21 containing the granular compounds and the base material layer 23 while feeding these two layers at different feeding rates, the granular compounds contained in the bearing alloy layer 21 are cleaved. As a result, the cleaved compounds become fine acicular compounds 12 that are dispersed in the Al matrix 11 of the bearing alloy layer 21 as illustrated in FIG. 1. The dimensions and number of the acicular compounds 12 contained in the bearing alloy layer 21 can be controlled by means of the difference between the feeding rates of the bearing alloy layer 21 and the base material layer 23 and the number of rolling passes during rolling.

Note that, the method of generating the acicular compounds 12 by means of a heat treatment that is described in the first embodiment of the production method, and the method of generating the acicular compounds 12 by means of a difference in feeding rates during rolling that is described in the second embodiment are merely examples. As long as the acicular compounds 12 are contained in the Al matrix 11, an arbitrary method that is not in accordance with the aforementioned methods can be used. Further, as a production process, the method for generating the acicular compounds 12 by means of the heat treatment of the first embodiment and the method for generating the acicular compounds 12 by means of a difference in feeding rates during rolling of the second embodiment may be combined.

An angular difference between the acicular compounds 12 contained in the bearing alloy 10 will now be described using FIG. 4. An angular difference θ between the acicular compounds 12 is measured in an observation field of view 30 that is set in advance as illustrated in FIG. 1. In the present embodiment, the observation field of view 30, for example, is set to a magnification of 200,000 times, and corresponds to a range of approximately 626 nm×430 nm.

In the aforementioned observation field of view 30, as illustrated in FIG. 1, a plurality of the acicular compounds 12 that are dispersed in the Al matrix 11 are observed. As illustrated in FIG. 4, a selected acicular compound 31 that is schematically illustrated is arbitrarily selected from among the plurality of acicular compounds 12 included in the observation field of view 30. Based on their shape, the acicular compounds 12 have a minor diameter and a major diameter. More specifically, a centroid point of the external shape of each acicular compound in the observation field of view is determined. Further, a maximum circumscribed circle and a circumscribed point thereof as well as a minimum inscribed circle and an inscribed point thereof are determined with respect to the external shape of the acicular compound centered on the centroid point. A direction in which the circumscribed point and the centroid point that are determined are linked is set as the major diameter direction, a length that is twice the distance between the circumscribed point and the centroid point is set as the major diameter length, a direction in which the inscribed point and the centroid point are linked is set as the minor diameter direction, and a length that is twice the distance between the inscribed point and the centroid point is set as the minor diameter length. An imaginary straight line 32 that is a hypothetical straight line is set by extending the major diameter of the selected acicular compound 31. The imaginary straight line 32 obtained by extending the major diameter of the selected acicular compound 31 intersects with a neighboring acicular compound 33 that is a different acicular compound 12 from the selected acicular compound 31 on the extended line. A difference between the angle of the neighboring acicular compound 33 and the angle of the imaginary straight line 32 is the angular difference θ. Even in a case where the positional relationship with respect to the neighboring acicular compound 33 is as indicated by a broken line in the FIG. 4, the difference between the angle of the neighboring acicular compound 33 and the angle of the imaginary straight line 32 is the angular difference θ. Thus, the angular difference θ is equivalent between the neighboring acicular compound 33 indicated by the solid line and the neighboring acicular compound 33 indicated by the broken line that are symmetrically located about the imaginary straight line 32 as the axis of symmetry. Therefore, the angular difference θ is in a range of 0°≤θ≤90°.

Figure 4:
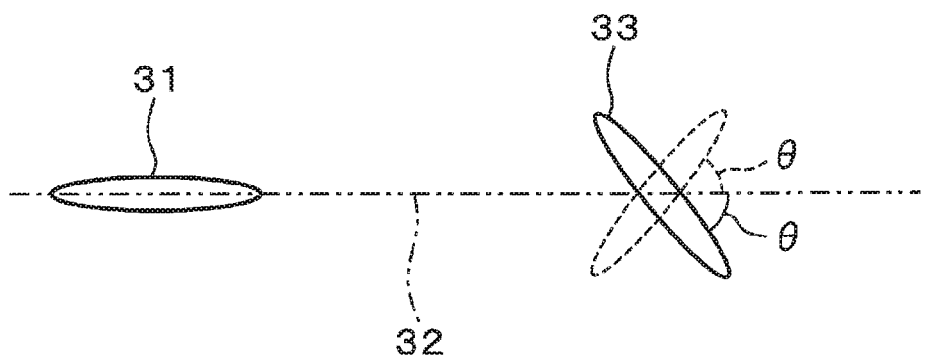
FIG. 4 is an explanatory drawing for describing a relation between acicular compounds in the Al-based bearing alloy according to one embodiment.

When the angular difference θ is defined as illustrated in FIG. 4, the plurality of acicular compounds 12 included in the observation field of view 30 include acicular compounds 12 for which the angular difference θ is in the range of 35° to 55°. Specifically, for all of the acicular compounds 12 included in the observation field of view 30, when each of the acicular compounds 12 is taken as the selected acicular compound 31 and the major diameter thereof is extended in the direction of the two ends to draw the imaginary straight line 32, and the angular difference θ with the major diameter of the neighboring acicular compound 33 that initially intersects with the imaginary straight line 32 in the direction of the two ends is measured, it is found that the angular difference θ is in the range of 35° to 55° for 30% or more of the acicular compounds 12 contained in the observation field of view 30. The observation field of view 30 corresponds to a setting region. Further, when the angular difference θ is measured for all of the acicular compounds 12 contained in the observation field of view 30, the observation field of view 30 preferably contains:

30% or more and 70% or less of acicular compounds 12 for which 35°≤θ≤55°,

10% or less of acicular compounds 12 for which 0°≤θ≤10°, and

10% or more of acicular compounds 12 for which 80°≤θ≤90°.

Figure 5:
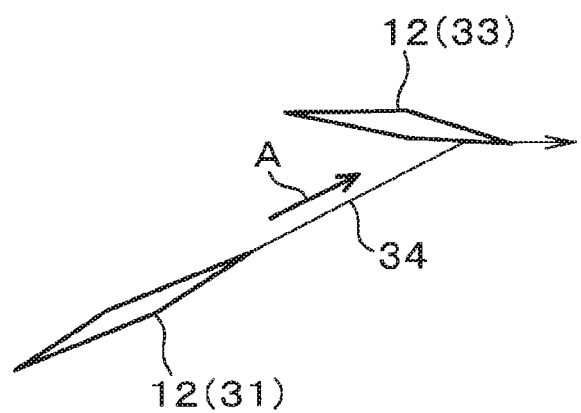
FIG. 5 is an explanatory drawing for describing expansion of a minute crack in the Al-based bearing alloy according to one embodiment.

By the angular difference θ between two of the acicular compounds 12 being in the range of 35°≤θ≤55° as described above, as schematically illustrated in FIG. 5, the direction of a minute crack 34 that expands in an arrow A direction from an arbitrary acicular compound 12, that is, the selected acicular compound 31, is transformed by an acicular compound 12 that is present on the extended line thereof, that is, a neighboring acicular compound 33. By specifying the arrangement of the acicular compounds 12 in this way, development of a minute crack into a large crack is inhibited. As a result, even though the bearing alloy 10 is aluminum-based, the bearing alloy 10 can maintain high fatigue strength for a long time period in a high temperature environment without a large crack that affects the strength thereof arising.

Next, examples of the bearing alloy 10 according to the aforementioned structure and comparative examples are described based on FIG. 6.

The bearing alloy 10 used in the examples and comparative examples contained 0.0 to 8.0 mass % of Zn, 0.0 to 4.0 mass % of Cu and 0.0 to 10.0 mass % of Si, with the balance being Al, additive elements and unavoidable impurities. The additive elements were Mg, Mn, Ti, or V or the like. The angular difference and minor diameter of the acicular compounds 12 contained in the bearing alloy 10 of the examples and comparative examples were controlled. As described above, the angular difference and minor diameter of the acicular compounds 12 were controlled by means of the temperature and treatment time period during a heat treatment, and by means of a feeding rate difference when rolling the bearing alloy layer 21 and the base material layer 23. Note that, in Comparative Example 1, a heat treatment for an aging treatment in which overaging did not occur was performed. In Comparative Example 2, although a heat treatment was not performed, feeding was performed so that there was a feeding rate difference of less than 10% during rolling. The obtained bearing alloys of the examples and comparative examples were joined with the base material layer 23 to serve as test specimens having a half-bearing shape. Among these, for the test specimens of Example 1 to Example 9 and Example 15 to Example 18, the bearing alloy 10 produced according to the first embodiment of the production method was joined as the bearing alloy layer 21 to the base material layer 23. Further, the test specimens of Example 10 to Example 14 were produced according to the second embodiment of the production method using the bearing alloy 10 as a precursor. The base material layer 23 was formed, for example, using an Fe-based alloy in which Fe was the main component. The obtained test specimens of the examples and comparative examples were subjected to tests based on the test conditions shown in FIG. 7.

The obtained test specimens were mounted in, for example, an engine of a vehicle such as a diesel engine or in a testing machine that imitated an engine of a vehicle, and were caused to slide against a counterpart member that was the sliding object. In the case of the testing machine that imitated an engine of a vehicle, the counterpart member corresponded to a shaft member such as a crankshaft. The test conditions (first test) at the time of sliding by the counterpart member were as follows.

(1) The contact interfacial pressure during sliding between the counterpart member and the test specimen was set to 75 MPa, 80 MPa, 85 MPa, and 90 MPa.

(2) The temperature during sliding between the counterpart member and the test specimen was set to 170° C.

(3) The turnover number during sliding between the counterpart member and the test specimen was set to $10^7$ times at 6,500 rpm.

Here, a contact interfacial pressure P is calculated by the equation P=L/S by dividing a load L applied to the test specimen from the counterpart member by a projected area S of a sliding portion of the test specimen. Hence, the test condition was P=L/S=75 MPa. The temperature during sliding between the counterpart member and the test specimen was adjusted by means of lubricating oil supplied to the sliding portion. That is, the temperature during sliding between the counterpart member and the test specimen was adjusted by means of lubricating oil supplied to the sliding portion, to thereby adjust the temperature to 170° C. Note that, since it was difficult to keep the temperature of the lubricating oil at a strictly constant temperature, the temperature was adjusted to 170° C.±2° C. In the testing machine in which the test specimen was mounted, the counterpart member was rotated $10^7$ times while satisfying the aforementioned conditions regarding the contact interfacial pressure and temperature. Thus, the test conditions of the present embodiment were set to conditions that imitated the severe environment in an engine of a vehicle.

Apart from the aforementioned conditions, the test conditions used for verification in the examples and comparative examples were as follows.

The supply pressure of lubricating oil supplied to the sliding portion was set to 0.4 MPa±0.03 MPa. VG 68 grade oil lubricating was used as the lubricating oil. The test specimen size was set to an inner diameter φ48 mm×axial direction length 14 mm×thickness 1.5 mm. The oil clearance between the counterpart member and the test specimen was set to 50 μm. Hardened S55C steel was adopted for the material quality of the counterpart member. The shaft roughness of the counterpart member was made Rz=0.5s or less according to JIS.

After testing in the aforementioned first test, if fatigue breakdown caused by a large crack in the test specimen at an interfacial pressure of 90 MPa was not found, the test specimen was determined to have passed with an "A" grade. Similarly, if fatigue breakdown caused by a large crack in the test specimen at an interfacial pressure of 85 MPa was not found, the test specimen was determined to have passed with a "B" grade. If fatigue breakdown was not found in the test specimen at an interfacial pressure of 80 MPa, the test specimen was determined to have passed with a "C" grade. If fatigue breakdown was not found in the test specimen at an interfacial pressure of 75 MPa, the test specimen was determined to have passed with a "D" grade. If fatigue breakdown was found at an interfacial pressure of 75 MPa, the test specimen was determined to have failed as indicated by "X". The aforementioned test conditions are based on the quality requirements demanded for vehicle engines and the like.

Further, the number of the acicular compounds 12 in test specimen 14 of the examples and comparative examples was measured in the aforementioned observation field of view 30 that was set in advance.

In addition to the aforementioned test conditions, a test (second test) was also performed "under an operating environment" for which the operating condition temperature of an actual engine was assumed. In the second test "under an operating environment", the test specimens were held for 3,000 hours at a temperature of 150° C. By holding the test specimens under such a temperature condition, a change arose in the hardness of the test specimens. At such time, if the percentage decrease in the hardness of the test specimen was 3% or less, the test specimen was determined as "A" grade that indicates best quality, if the percentage decrease in the hardness of the test specimen was more than 3% and not more than 5%, the test specimen was determined as "B" grade that indicates good quality, if the percentage decrease in the hardness of the test specimen was more than 5% and not more than 8%, the test specimen was determined as "C" grade that indicates acceptable quality, and if the percentage decrease in the hardness of the test specimen was more than 8%, the test specimen was determined as "X" grade that indicates unacceptable quality. The conditions of 150° C. for 3,000 hours are based on the quality requirements demanded for vehicle engines and the like.

As is clear from the results shown in FIG. 6, with respect to the acicular compounds 12 contained in the bearing alloy layer 21, there is a correlation between the size of the acicular compounds, that is, the largest minor diameter of the acicular compounds that serves as an index thereof, and the number of the acicular compounds 12. This is because the acicular compounds 12 are generated by a heat treatment as in the first embodiment of the production method or by cleavage of granular compounds as in the second embodiment. Therefore, as the largest minor diameter of the acicular compounds 12 decreases, the acicular compounds 12 are made finer and the number of the acicular compounds 12 increases. Note that, the term "largest minor diameter" refers to the minor diameter having the largest length among the respective minor diameters of the acicular compounds in the observation field of view.

It was found that in Example 1 to Example 18 in which the bearing alloy 10 contains the acicular compounds 12, unlike Comparative Example 1 and Comparative Example 2, fatigue breakdown was not observed after the test. Further, it was found that in Example 1 to Example 18 the percentage decrease in hardness even when tested under an operating environment was a low amount of 8% or less. In Comparative Example 1 and Comparative Example 2 the bearing alloy 10 did not contain the acicular compounds 12. Therefore, it was found that the acicular compounds 12 contained in the bearing alloy 10 contributed to inhibiting the development of large cracks in the bearing alloy 10 and also suppressed a decrease in hardness.

On the other hand, when the largest minor diameter of the acicular compounds 12 was greater than 50 nm as in Example 4, or when the largest minor diameter of the acicular compounds 12 was a small diameter of 1 nm or less as in Example 3, fatigue breakdown was confirmed under an environment with a more severe condition of 90 MPa. Further, in Example 3 and Example 4, the percentage decrease in hardness was large in comparison to Example 1 and Example 2. The reason is that, when the minor diameter of the acicular compounds 12 is large as in Example 4, the influence of discontinuous planes between the Al matrix 11 and the acicular compounds 12 in the bearing alloy 10 is liable to appear. It is considered that for this reason the possibility of minute cracks arising which take discontinuous planes between the Al matrix 11 and the acicular compounds 12 as starting points can increase. Consequently, it is considered that when the minor diameter of the acicular compounds 12 is greater than 50 nm, it leads to fatigue breakdown and a decrease in hardness after tests under more severe conditions. On the other hand, when the largest size of the minor diameter of the acicular compounds 12 is a small value of 1 nm as in Example 3, the acicular compounds 12 contained in the Al matrix 11 in the bearing alloy 10 become extremely fine. Consequently, when a minute crack in the Al matrix 11 expands, the expanding crack easily avoids, that is, bypasses, the extremely fine acicular compounds 12 and expands. It is considered that, as a result, in the case of fine acicular compounds 12 whose minor diameter is 1 nm or less, the ability to inhibit development into large cracks or to inhibit a decrease in hardness under severer conditions decreases.

Based on the examples described above, it is considered that it is preferable to set the minor diameter of the acicular compounds 12 in a range of 2 nm to 50 nm.

Further, even when the minor diameter of the acicular compounds 12 was set, depending on the condition regarding the angular difference θ, as in Example 16 and Example 17, under an environment of 80 MPa in which the test conditions were more severe, fatigue breakdown was confirmed and the hardness was also caused to decrease. This indicates that the development of a minute crack into a large crack is influenced by the angular difference θ between the acicular compounds 12. That is, by the bearing alloy 10 containing 30% or more of acicular compounds 12 for which the angular difference θ is in a range of 35° to 55°, it indicates that the development of minute cracks into large cracks is effectively hindered by shifting the directions of the minute cracks, and a decrease in hardness is also suppressed. In particular, in a case where the condition with respect to the angular difference θ of the acicular compounds 12 is satisfied as in Example 1, high strength can be maintained even under more severe conditions.

Based on the above described examples, it is found that it is preferable for the acicular compounds 12 to include 30% or more of acicular compounds 12 for which the angular difference θ is in a range of 35° to 55°. Further, it is found that, when taking the production cost into consideration, it is preferable that the acicular compounds 12 include not more than 70% of the acicular compounds 12 for which the angular difference θ is in a range of 35° to 55°.

In a case where the condition with respect to the angular difference θ of the acicular compounds 12 is satisfied as in Example 2 to Example 7, high strength can be maintained even under severe conditions. For example, in the case of Example 2, if the condition regarding the angular difference θ is satisfied in the vicinity of the lower limit thereof, high strength can be maintained even under severe conditions. In the case of Example 4, even when the angular difference θ is in the vicinity of the lower limit with respect to the range of 35° to 55°, by appropriately controlling the acicular compounds 12 for which the angular difference θ is in the range of 80° to 90° and the range of 0° to 10°, respectively, high strength can be maintained even under severe conditions. By controlling the acicular compounds 12 for which the angular difference θ is in the range of 35° to 55° as in Example 7, high strength can be maintained even under severe conditions.

On the other hand, even in a case where the minor diameter of the acicular compounds 12 is large or is small as in Example 8 and Example 9, sufficient strength can be maintained by appropriately controlling the angular difference θ. Further, as will be understood from Example 1 to Example 18, the strength of the bearing alloy 10 can be maintained using either of the production methods.

As described above, even in a high temperature environment that is required for diesel engines of recent years, the bearing alloy 10 of the present embodiment maintains sufficient strength during a period corresponding to an operating period of the diesel engine. Therefore, even after a test under the aforementioned test conditions, fatigue breakdown that accompanies fatigue does not occur in the bearing alloy 10 of the present embodiment. Further, the bearing alloy 10 of the present embodiment contains Al as a main component. Therefore, the bearing alloy 10 of the present embodiment is inexpensive compared to a Cu-based bearing alloy, and also high corrosion resistance with respect to sulfur content. Therefore, the bearing alloy 10 of the present embodiment can increase corrosion resistance, and even though the bearing alloy 10 is aluminum-based, can maintain high strength for a long period of time in a high temperature environment.

Further, in the present embodiment the bearing alloy 10 contains two or more types of element selected from Zn, Cu and Si as additive elements. Accordingly, even though the bearing alloy 10 is aluminum-based, the bearing alloy 10 can maintain high strength for a long period of time in a high temperature environment with inexpensive additive elements.

In addition, in the present embodiment, in the bearing alloy 10 the acicular compounds 12 precipitate in the structure of the Al matrix 11. The acicular compounds 12 are dispersed in a seemingly non-oriented manner in the structure of the Al matrix 11. Therefore, expansion of a minute crack that arises in the Al matrix 11 is obstructed by the acicular compounds 12 that are randomly dispersed without a specific direction of the acicular compounds 12 being defined, and the expansion direction of the minute crack is changed. As a result, development of the minute crack into a large crack that affects the strength of the bearing alloy 10 is inhibited. In particular, development of a minute crack into a large crack is effectively inhibited by defining the angular differences θ of the acicular compounds 12 as well as the proportions thereof. Therefore, even though the bearing alloy 10 is aluminum-based, the bearing alloy 10 can maintain high strength for a long period of time in a high temperature environment.

In the present embodiment, the more minute that the acicular compounds 12 which precipitate in the bearing alloy 10 are, the more difficult it is for the acicular compounds 12 to become the starting points of cracks. Therefore, the acicular compounds 12 are made sufficiently minute by making the minor diameter thereof not more than 50 nm. By this means, the acicular compounds 12 do not become the starting points for cracks. Accordingly, even though the bearing alloy 10 is aluminum-based, the bearing alloy 10 can maintain high strength for a long period of time in a high temperature environment. On the other hand, the smaller that the acicular compounds 12 become, the easier it is for an expanding crack to bypass the acicular compounds 12 and expand, and thus the effect of inhibiting development of a minute crack into a large crack decreases. Therefore, it is preferable to set the minor diameter of the acicular compounds 12 to a value of 2 nm or more.

The present invention described above is not limited to the embodiment described above and can be implemented in a variety of other embodiments to the extent that they do not depart from the substance of the present invention.

The invention claimed is:

1. An Al-based bearing alloy, comprising:
   an Al matrix, consisting of Al as a main component, two or more types of elements selected from 0.5-8.0 mass % Zn, 0.5-4.0 mass % Cu, and 1.0-10.0 mass % Si, with 0.1-0.5 mass % Mg as an additive, and
   a plurality of needle-shaped acicular compounds that precipitate in a structure of the Al matrix, the acicular compounds each having a minor diameter and a major diameter,
   wherein the minor diameter of the acicular compounds is 50 nm or less,
   wherein the major diameter of the acicular compounds is 100 nm or more,
   wherein the acicular compounds include a selected acicular compound and neighboring acicular compounds located on an imaginary straight line extending from the major diameter of the selected acicular compound,
   wherein the neighboring acicular compounds include compounds for which an angular difference is in a range of 35° to 55°, the angular difference being a difference of an angle between the imaginary straight line and the major diameter of the neighboring acicular compound, and in a setting region, the acicular compounds include 30% or more of acicular compounds for which the angular difference is in a range of 35° to 55°.

2. The Al-based bearing alloy according to claim 1, wherein:
   in the setting region, the acicular compounds include:
   30% to 70% of the acicular compounds are disposed at the angular difference in a range of 35° to 55°,
   10% or less of the acicular compounds are disposed at the angular difference in a range of 0° to 10, and
   10% or more of the acicular compounds are disposed at the angular difference in a range of 80° to 90°.

3. A slide bearing, comprising:
   a bearing alloy layer that is formed using an Al-based bearing alloy according to claim 1, and a base material provided in a superimposed manner on the bearing alloy layer.

\* \* \* \* \*